United States Patent Office 3,453,907
Patented July 8, 1969

3,453,907
PLANETARY GEARING
Masaaki Noguchi, Nagoya-shi, and Shigeru Sakakibara, Aichi-ken, Japan, assignors to Aisin Seiki Company Limited and Toyota Jidosha Kogyo Kabushiki Kaisha, Aichi-ken, Japan
Filed Jan. 30, 1968, Ser. No. 701,680
Claims priority, application Japan, Jan. 30, 1967, 42/6,166
Int. Cl. F16h 1/46
U.S. Cl. 74—803      4 Claims

ABSTRACT OF THE DISCLOSURE

A planetary reduction gearing containing two sets of two stage planetary gears wherein the both first stage gears are arranged in an overlapped condition with each other and mesh with a first internal gear at different zones thereof when seen axially of said shafts and the both second stage gears are arranged and mesh with a second internal gear in the similar way.

---

This invention relates to improvements in and relating to planetary reduction gearings. More specifically, it relates to a planetary reduction gearing wherein two-stage planetary gears or a first pair of and a second pair of planetary gears are provided on a pair of parallel rotatable shafts arranged symmetrical to the longitudinal axis of said gearing, said gears are mounted in a bearing carrier or yoke integral with an input shaft, said first stage gears being kept in meshing relationship with an internal gear mounted in a gear casing enclosing said planetary gears, said second stage gears being kept in meshing relationship with a second internal gear mounted in said gear casing, said bearing carrier or yoke being rigid with an input shaft or ouput shaft of said gearing.

It is an object of the invention to provide a planetary reduction gearing the planetary gears of which have larger modules than in the case of conventional comparative gearings, thereby capable of transmitting a larger turning torque.

A further object is to provide a planetary reduction gearing of the kind above referred to, capable of providing a smoother gear engagement, thereby assuring an even load distribution at the meshing points of the gearing.

Still another object is to provide a reduction gearing of the above kind wherein the wear of each constituting gear is reduced to a possible minimum.

These and further objects, features and advantages of the present invention will become more clear when read the following detailed description of the invention by reference to the drawings illustrative of a preferred embodiment of the invention is comparison with a comparative conventional gearing.

Figure 1:
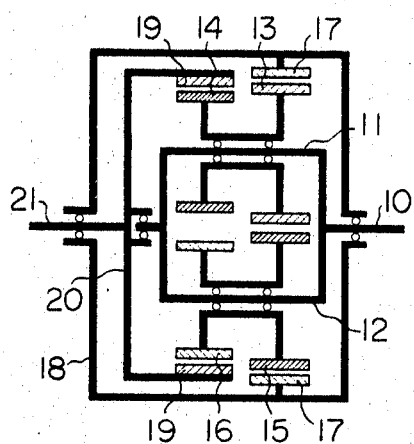
FIG. 1 is a schematic explanatory representation of a comparative conventional planetary gearing.

As a preliminary description, a conventional comparative mechanism will be briefly described with reference to FIG. 1.

In this conventional mechanism, 10 denotes an input shaft and 11 and 12 are two eccentric shafts arranged symmetrical with each other and physically in parallel to said input shaft 10. Two stage planetary gears 13 and 14 made integral with each other are rotatably mounted on the first parallel shaft 11 and, in the similar way, further two stage planetary gears 15 and 16 again made integral with each other and having same configurations as the first pair of planetary gears 13 and 14 are rotatably mounted on the second parallel shaft 12. First stage planetary gears 13 and 15 of the both gear sets are kept in meshing relationship with an integral gear 17 which is fixedly mounted on the inside wall surface of a gear casing 18, while both second stage gears 14 and 16 are kept in meshing relationship with an internal gear 19 which is fixedly mounted on a rotatable yoke 20 rigid with an output shaft 21.

As commonly known to those skilled in the art, the reduction ratio can be varied to a considerable degree as desired, by properly selecting the numbers of teeth as well as the modules of these planetary and internal gears.

For better understanding of the functional nature of the above described planetary gearing, a mathematical analysis thereof will be given hereinbelow.

Now assuming:

The number of teeth of internal gear 17 is $z_{17}$.

The number of teeth of each of planetary gears 13 and 15 is $z_{13.15}$.

The number of teeth of each of planetary gears 14 and 16 is $z_{14.16}$.

The number of teeth of internal gear 19 is $z_{19}$.

The modules of internal gear 17, planetary gears 13 and 15 are equal to each other, amounting to a common value which may be denoted $M_I$.

Th modules of internal gear 19, planetary gears 14 and 16 are equal to each other, amounting to a common value which may be denoted $M_{II}$.

Under these conditions, the reduction ratio of the gearing will be:

$$\frac{\text{R.p.m. of input shaft}}{\text{that of output shaft}} = 1 : \left(1 - \frac{z_{17} \cdot z_{14.16}}{z_{13.15} \cdot z_{19}}\right)$$

The eccentricity of shaft 11 or 12 will be:

$$\tfrac{1}{2} M_I (z_{17} - z_{13.15}) = \tfrac{1}{2} M_{17}(z_{19} - z_{14.16})$$

From the above formulae, a properly selected reduction ratio such as for instance $\pm 1/80$; $\pm 1/60$; $\pm 1/40$; or the like may be easily obtained substantially by selecting the respective number of teeth of each of said gears.

In order to avoid any mechanical interference between each pair of symmetrically arranged gears such as 13 and 15 or 15 and 16, the outside diameter of each of the planetary gears should not be larger than 50% of the dedendum of the mating internal gear which means a considerable disadvantageously governing condition in the design of the planetary reduction gearing of the kind above referred to.

Several preferred numerical examples are shown hereinbelow for better understanding of the aforementioned type of planetary gearing.

EXAMPLE 1

$z_{17}=88$; $z_{13.15}=42$; $z_{14.16}=41$; and $z_{19}=87$ $$\text{The reduction ratio}=1:\left(1-\frac{88}{42}\cdot\frac{41}{87}\right)$$
$$=1:\frac{1}{79.4}$$

Now assuming:

$M_I = M_{II} = 2$ then the pitch circle diameter $D_{17}$ of gear $17 = 2 \times 88 = 176$; and the pitch circle diameter $D_{13.15}$ of gear 13 or 15 $= 2 \times 42 = 84$;

the similar diameter $D_{14.16}$ of gear 14 or $16 = 2 \times 41 = 82$;

the similar diameter $D_{19}$ of gear $19 = 2 \times 87 = 174$;

the eccentricity $= \frac{1}{2} \times 2(88-42)$
$= \frac{1}{2} \times 2(87-41)$
$= 46$

EXAMPLE 2

$z_{17}=65$; $z_{13.15}=31$; $z_{14.16}=30$; and $z_{19}=64$ then, the reduction ratio will be:

$$1:\left(1-\frac{65}{31}\cdot\frac{30}{64}\right)=1:\frac{1}{58.3}$$

Now assuming:

$M_I = M_{II} = 2.1$ then, the pitch circle diameter $D_{17}$ of gear $17 = 2.1 \times 65 = 136.5$ the similar diameter $D_{13.15}$ of gear 13 or $15 = 2.1 \times 31 = 65.1$ the similar diameter $D_{14.16}$ of gear 14 or $16 = 2.1 \times 30 = 63$ the similar diameter $D_{19}$ of gear $19 = 2.1 \times 64 = 134.4$ the eccentricity $= \frac{1}{2} \times 2.1(65-31)$
$= \frac{1}{2} \times 2.1(64-30)$
$= 35.7$

EXAMPLE 3

$z_{17}=48$; $z_{13.15}=22$; $z_{14.16}=21$; and $z_{19}=47$ then, the reduction ratio will be:

$$1:\left(1-\frac{48}{22}\cdot\frac{21}{47}\right)=1:\frac{1}{39.8}$$

When assuming:

$M_I = M_{II} = 2$ the pitch circle diameter $D_{17}$ of gear $17 = 2 \times 48 = 96$ the similar diameter $D_{13.14}$ of gear 13 or $14 = 2 \times 22 = 44$ the similar diameter $D_{14.15}$ of gear 14 or $15 = 2 \times 21 = 42$ the similar diameter $D_{19}$ of gear $19 = 2 \times 47 = 94$ the eccentricity $= \frac{1}{2} \times 2(48-22)$
$= \frac{1}{2} \times 2(47-21)$
$= 26$ Next, referring to FIG. 2, the principle of the novel planetary gearing will be described hereinbelow in detail.

In this drawing, 30 denotes an input shaft with which a yoke or bearing carrier 31 is made integral and carries therein two pairs of anti-friction bearings 32, 33 and 34, 35. A pair of parallel shafts 36 and 37 are mounted rotatably in said bearings 32 and 34 and 33 and 35, respectively. Input shaft 30 is rotatably supported by an anti-friction bearing 38 which is mounted in a gear casing 39. Two stage gears 40 and 41 are rigidly supported and, in the similar way, another pair of two-stage planetary gears 42 and 43 are mounted rigidly on said shaft 36. Gears 40 and 42 have a common number of teeth and a common module. The same is applied to another planetary gears 41 and 43. As will be clearly seen from FIG. 2, gears 40 and 42 are arranged on different planes and this feature is applied to gears 41 and 43, these gear arrangements being, so to speak, in different phases. When seen axially, each pair of similar planetary gears 40 and 42 or 41 and 43 is considerably overlapped with each other, but in such a manner that there arises no mechanical interference of each of the planetary gears with the respective shaft 36 or 37 of the respective companion gear. Gears 40 and 42 are kept in meshing relation with an internal gear 44 which is rigidly mounted on the inside wall surface of the gear casing 39. As an example, numbers of teeth of the various gears may be taken as follows:

TABLE 1

| Gear Nomination: | Number of Teeth | Module |
|---|---|---|
| 44 | $z_{44}$ | $M_{44}$ |
| 40 | $z_{40}$ | $M_{40}$ |
| 42 | $z_{42}(=z_{40})$ | $M_{42}(=M_{40})$ |
| 41 | $z_{41}$ | $M_{41}$ |
| 43 | $z_{43}(=z_{41})$ | $M_{43}(=M_{41})$ |
| 45 | $z_{45}$ | $M_{45}(=M_{41})$ |

From the above data, the reduction ratio will be:

$$\frac{\text{R.p.m. of input shaft}}{\text{R.p.m. of output shaft}}=1:\left(1-\frac{z_{44}}{z_{40}}\cdot\frac{z_{41}}{z_{45}}\right)$$

Eccentricity of planetary shaft $$=\frac{1}{2}M_{44}(z_{44}-z_{40})=\frac{1}{2}M_{44}(z_{45}-z_{43})$$

From practical requirements, the upper limit of the outside diameter of planetary gear 40 or 42 is selected to be about 60% of the dedendum diameter of the internal gear 44 and the upper limit of the outside diameter of the planetary gear 41 or 43 should preferably be about 60% of the dedendum diameter of the internal gear 45.

In order to make the novel planetary gearing according to this invention more clear and specific, several numerical examples will be given hereinbelow, the reduction ratio being assumed to be substantial same as before:

EXAMPLE 4

$z_{44}=58$; $z_{40}=34$; $z_{41}=33$ and $z_{45}=57$ then, the reduction ratio will be:

$$1:\left(1-\frac{58}{34}\cdot\frac{33}{57}\right)=\frac{1}{80.75}$$

Now assuming:

$M_{40,\ 42\ \text{or}\ 44} = M_{41,\ 43\ \text{or}\ 45} = 3$ and then:

the pitch circle diameter $D_{44}$ of gear $44 = 3 \times 58 = 174$;

the similar diameter of $D_{40\ \text{or}\ 42}$ of gear 40 or $42 = 3 \times 34 = 102$;

the similar diameter $D_{41\ \text{or}\ 43}$ of gear 41 or $43 = 3 \times 33 = 99$;

the similar diameter $D_{45}$ of gear $45 = 3 \times 57 = 171$;

the eccentricity $= \frac{1}{2} \times 3(58-34) = 36$ or
$= \frac{1}{2} \times 3(57-33) = 36$

EXAMPLE 5

$z_{44}=46$; $z_{40}=26$; $z_{41}=25$ and $z_{45}=45$ then, the reduction ratio will be:

$$1:\left(1-\frac{46}{26}\cdot\frac{25}{45}\right)=\frac{1}{58.5}$$

Now assuming:

$M_{40,\ 42\ \text{or}\ 44} = M_{41,\ 43\ \text{or}\ 45} = 3$ then, the pitch circle diameter $D_{44}$ of gear $44 = 3 \times 46 = 138$;

the similar diameter $D_{40\ \text{or}\ 42}$ of gear 40 or $42 = 3 \times 26 = 78$;

the similar diameter $D_{41\ \text{or}\ 43}$ of gear 41 or $43 = 3 \times 25 = 75$;

the similar diameter $D_{45}$ of gear $45 = 3 \times 45 = 135$;

the eccentricity $= \frac{1}{2} \times 3(46-26)$
$= \frac{1}{2} \times 3(45-25)$
$= 30$

EXAMPLE 6

$z_{44}=32$; $z_{40}=18$; $z_{41}=17$ and $z_{45}=31$ then, the reduction ratio will be:

$$1 : \left(1 - \frac{32}{26}\cdot\frac{17}{31}\right) = \frac{1}{39.8}$$

Now assuming:

$M_{40,\ 42\ or\ 44} = M_{41,\ 43\ or\ 45} = 3$ then, the pitch circle diameter $D_{44}$ of gear
 $44 = 3 \times 32 = 96$
the similar diameter $D_{40\ or\ 42}$ of gear 40 or
 $42 = 3 \times 18 = 54$
the similar diameter $D_{41\ or\ 43}$ of gear 41 or
 $43 = 3 \times 7 = 51$
the similar diameter $D_{45}$ of gear $45 = 3 \times 31 = 93$
the eccentricity $= \frac{1}{2} \times 3(32-18)$
 $= \frac{1}{2} \times 3(31-17)$
 $= 21$ When comparing the foregoing conventional examples with those according to this invention, under such assumption that the reduction ratio is similar in both cases and the respective diameters of internal gears are also similar to said both cases, the latter diameters being naturally decisive substantially of the overall dimensions of the gearing, the module is considerably different to represent substantially a ratio of 2:3. Therefore, as will be clearly supposed, the transmission torque will naturally be larger in the novel gearing than in the case of the conventional technique, which means thus a considerable progress in the art.

As for the diameter of the planetary gear, its value is considerably larger, say showing a 20% increase, for the novel gearing than in the conventional comparative one, thus providing in the former a higher engaging ratio and capable of transmitting a correspondingly larger torque. A correspondingly smooth transmitting operation will naturally be assured. Further, with similar sized internal gears, the planetary gears may have considerably larger diameters which means a lesser number of revolutions per minute of the planetaries for same input r.p.m.'s, thus providing reduced rotations about its axis and therefore correspondingly reduced wears. At the same time, an elongated durable life and a smoother and noiseless operation of the gearing can be assured.

Figure 2:
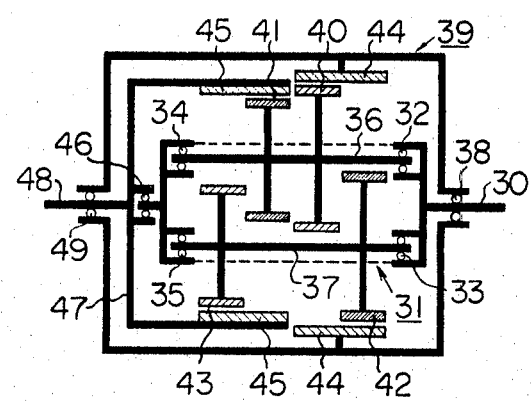
FIG. 2 is a similar explanatory representation of a novel planetary gearing embodying the principle of the invention.

For completing the detailed description of the schematic embodiment shown FIG. 2, the numeral 46 denotes anti-friction bearing arranged for mounting rotatably the left-hand end of said learning carrier or yoke 31, said bearing being mounted in turn on second yoke 47 which is made integral with output shaft 48. This yoke 47 is arranged concentrically to the first or inner yoke 31 as well as to gear casing 39. As shown, the second yoke 47 mounts rigidly said internal gears 44 and 45. Between casing 39 and output shaft 48, there is provided antifriction gearing shown at 49 for rotatably mounting the output shaft 48.

Figure 3:
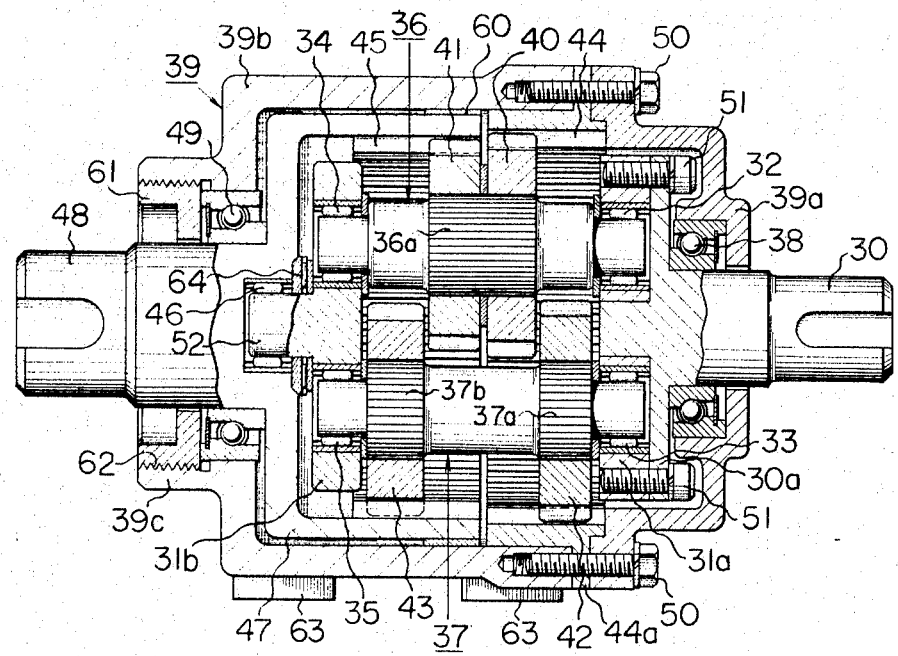
FIG. 3 is substantially an axially sectional view of a more specific embodiment of the invention embodying the same principle of the invention.
Figure 4:
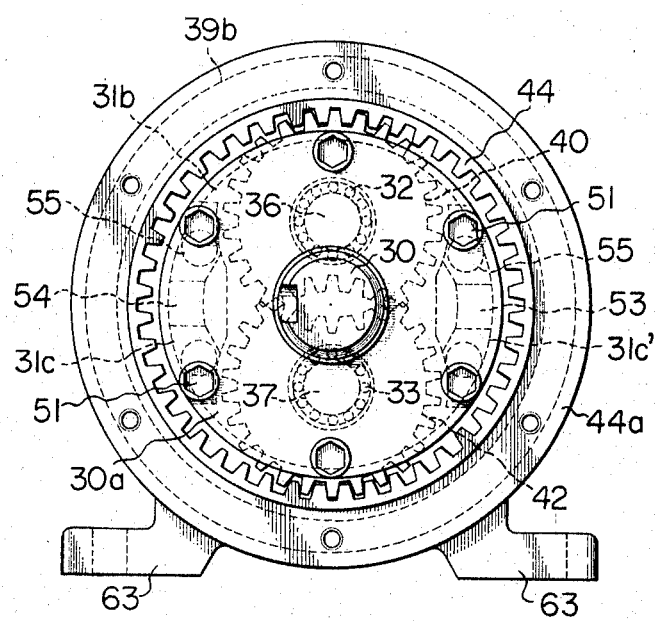
FIG. 4 is an end view of the gearing shown in FIG. 3 and seen from the input side wherein however input casing element and an input shaft bearing have been omitted from the drawing for demonstrating clearly the internal construction of the gearing.
Figure 5:
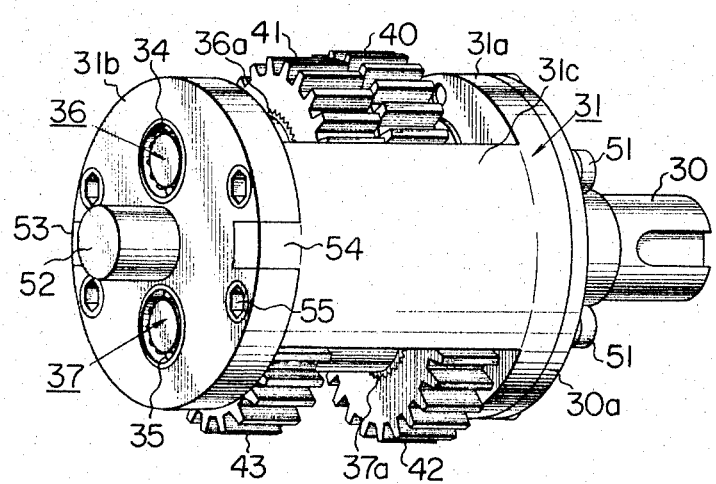
FIG. 5 is a perspective view of internal operating parts of said gearing shown in FIGS. 3–4.

A more specific embodiment of the invention, being based upon the foregoing principle described with reference to FIG. 2 is shown in FIGS. 3–5.

In these figures, the input shaft at 30 is rotatably mounted by anti-friction bearing 38, as already mentioned hereinbefore, which is fitted in the casing assembly 39 consisting of two casing elements 39a and 39b bolted rigidly together at 50.

The input shaft 30 is formed integrally with a flange 30a positioned within the interior space of the casing assembly. This flange 30a is bolted at 51 to the bearing carrier 31a mounting therein said anti-friction bearings 32 and 33, while said bearings 34 and 35 are mounted in the bearing carrier 31b, thereby rotatably supporting the shafts 36 and 37 for two stage planetary gears 40, 41 and 42, 43 as was referred to. Said bearing carrier 31b mounts rotatably at its center a trunnion 52. The outlet carrier part 31b is rigidly connected with the inlet side bearing carrier part 31a by means of tongue-and-groove connections at 53 and 54, as well as a plurality of set bolts 55, through the integral projections 31c and 31c' rigid with the inlet part 31a.

The central trunnion 52 is supported at its free end in an inner bearing 56 of anti-friction type which is formed in the central region of output shaft 48, opening towards the center of the interior space of the casing assembly 39. In effect, input shaft 30, bearing carrier assembly 31a and 31b are made integral into a unit which is rotatably mounted by means of ball bearing 38 for input shaft 30, on the one hand, and of needle roller bearing 56 fitted in the shaft end of output shaft 48 as briefly referred to hereinbefore.

As seen from FIGS. 3 and 4, a pair of needle roller bearings 32 and 33 arranged symmetrically relative to the input shaft 30 and mounted in the bearing carrier part 31a. In the same way, needle roller bearings 34 and 35 are mounted in the bearing carrier part 31b. Shaft 36 is mounted rotatably in said bearings 32 and 34 and in the similar way, shaft 37 is turnably supported by needle roller bearings 33 and 35.

Shaft 36 is formed at its central region with a serrated or splined part 36a on which planetary gears 40 and 41 of different diameters are fixedly mounted. On the other hand, the shaft 37 is formed with separated, serrated or splined parts 37a and 37b on which planetary gears 42 and 43 are fixedly mounted, for instance, relying upon the press-fit technique. Therefore, planetary gears $N_2$ and $N_3$ form in combination a unitary and rigid member, while planetary gears 42 and 43 are positioned separately on the shaft 37 as was already referred to, in effect, however, constituting a practical rotary unit. These four planetary gears are assembled within the interior space of bearing carrier 31, so to speak, in different phases and naturally without any mutual mechanical interference. It is an easy matter to select respective diameters of the four gears so as to satisfy the last mentioned requirement.

Internal gear 44 is formed with a radial flange 44a which is positively positioned between two casing parts 39a, 39b and bolted thereto at 50, so as to act as a stationary gear with which the planetary gears 40 and 42 are kept in meshing relationship at different phases or regions.

Internal gear 45 is made as a part of yoke 47, thus rigid with the output shaft 48. The yoke 47 with its outer peripheral surface and the gear casing 39 with its inner wall surface cooperate with each other so as to establish a journal bearing at 60. In addition, there is provided the ball bearing 46 therebetween for allowing the output shaft 48 relative to the gear casing 39, as was briefly referred to hereinbefore. As seen in FIG. 3, planetary gears 41 and 43 are kept in meshing relation with internal gear 45 in different phases. Ball bearing 46 is kept firmly in position by means of a screwed positioner 61 having male screw threads formed on its outer peripheral surface and kept in meshing with corresponding female screw threads, at 62, formed on the inside wall surface of the socket part at 39c of the gear casing 39 which is provided four supporting legs 63, so as to mount the gearing on a proper floor surface.

In FIG. 5, a perspective view of the planetary gearing is shown wherein however the cover casing 39 and the output shaft 48 have been omitted for clear demonstration of the mutual relationship between the inner working parts, especially input shaft 30, bearing carrier 31, two stage planetary gear sets 41, 42 and 43, 44. Between yoke 47 and output side bearing carrier part 31b, there is provided a thrust type needle roller bearing 64.

The operation of the gearing so far described is as follows:

When the gearing is operating, motion is transmitted from a prime mover, not shown, coupled to the input shaft 30 to the latter. Rotation is thus transmitted from the input shaft 30 through the intermediary of planetary gears 40–43 and yoke 47 to the output shaft 48. The obtainable reduction ratio has already been described in connection with FIG. 2 hereinbefore.

Since all the planetary gears are fixed on to the respective gear shafts 36 and 37 through the serrations or spline type connections by, for instance, press-fit technique, an easy angular adjustment among all of the planetary gears relative to the respective internal gears 44–45 is assured, especially between the first stage and the second stage planetary gear when assembling the gearing assembly. For instance, an allowable limit of $\frac{1}{100}$ mm. is highly difficult to keep in the assembly of each pair of the first and the second gear together, when relying upon the conventional technique. But, when adopting the above-mentioned fixing technique, such precise allowance can easily be realized. When adopting the aforementioned gear-attaching technique, in addition to the aforementioned gear arrangement constituting the main feature of the invention, each two stage gears can be kept in an even engagement with the related internal gear so that otherwise possible gear noises are considerably suppressed and a more evenly distributed load distribution on the teeth of each of the internal gears can be assured without any difficulty.

The provision of bearing metal at 60 between the casing 39 and the yoke 47 will considerably contribute for assuring smooth and even operating of the working gears contained in the gearing.

The provision of the thrust roller needle bearing at 64 will contribute considerably to balance out the otherwise possible axial thrust taking place during the power transmission through the present gearing.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

For instance, the yoke 47 may be fixedly connected with the input shaft in place of the output shaft.

What we claim is:
1. A reduction gearing comprising: a gear casing, an input shaft mounted therein, an output shaft having a yoke mounted in said casing, a bearing carrier rigidly attached thereto, a plurality of bearings mounted on said carrier, a first pair of two stage planetary gears rigid to each other, a first shaft for said first pair of gears, a second pair of two stage planetary gears rigid to each other, a second shaft for said second pair of gearing, two separate internal gears, one internal gear rigidly mounted on said gear casing and the other internal gear rigidly mounted on said yoke, said shafts being mounted in said bearings and arranged in parallel to each other and in symmetry to the axes of said input and output shafts, each first stage gear of said two pairs of gears being kept in meshing relationship with one of said internal gears, each second stage gear of said two pairs of gears being kept in meshing relationship with the remaining one of said internal gears, said gearing being characterized in that the both first stage gears are arranged in an overlapped condition with each other and mesh with said first internal gear at different zones thereof when seen axially of said shafts and the both second stage gears are arranged and mesh with said second internal gear in the similar way.

2. A gearing as claimed in claim 1, characterized by that each of said planetary gears is fixed onto the respective supporting shaft by the serratings formed on the shaft.

3. A gearing as claimed in claim 1, characterized by that between gear casing and the yoke there is provided a bearing metal fixed on the inside wall of said casing.

4. A gearing as claimed in claim 1, characterized by that a thrust type roller needle bearing is provided between said yoke and said bearing carrier.

References Cited
UNITED STATES PATENTS

| | | | |
|---|---|---|---|
| 1,432,090 | 10/1922 | Simpson | 74—803 |
| 2,700,311 | 1/1955 | Bade | 74—674 |
| 2,868,037 | 1/1959 | Hindmarch | 74—803 X |
| 2,955,487 | 10/1960 | Malley | 74—803 |

ARTHUR T. McKEON, *Primary Examiner.*

U.S. Cl. X.R.

74—410